Patented Dec. 11, 1923.

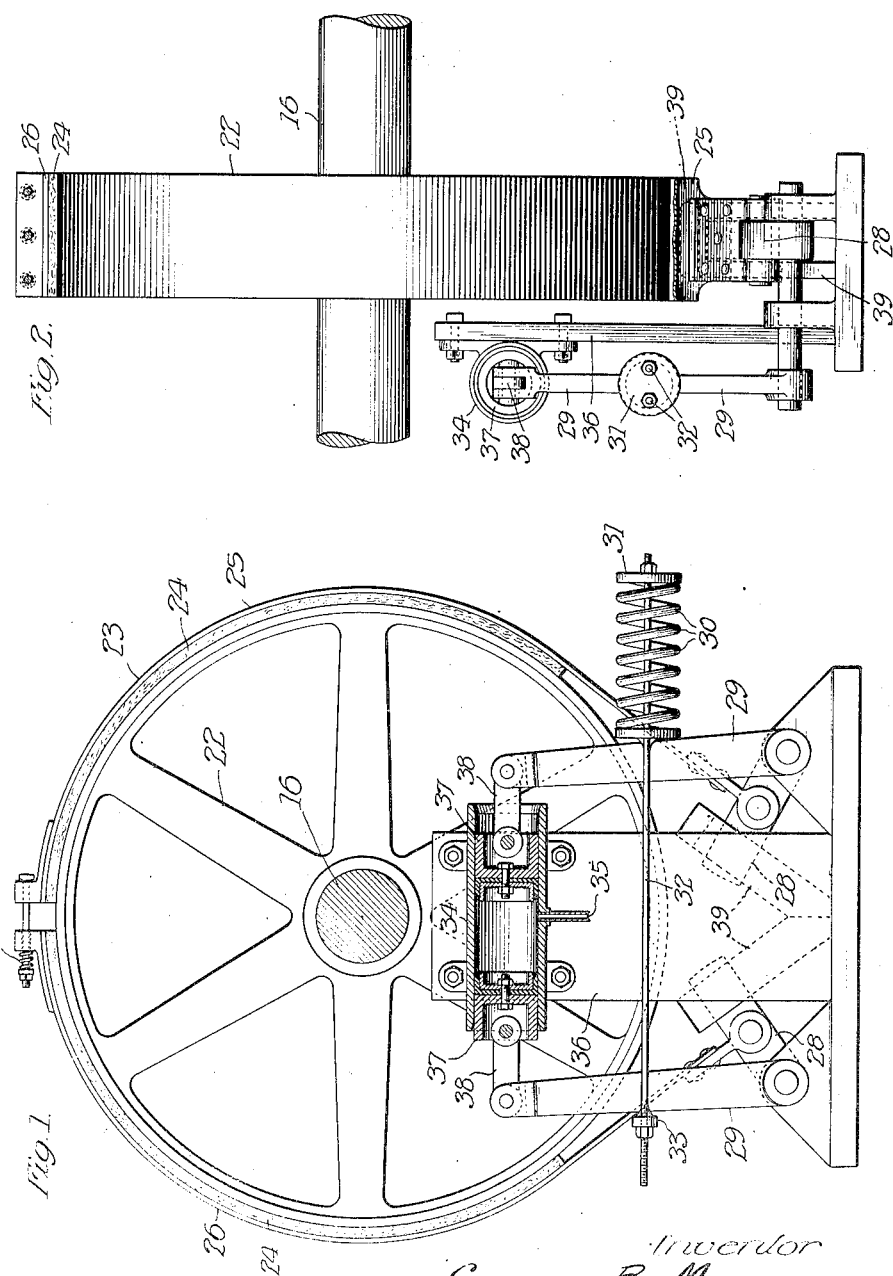

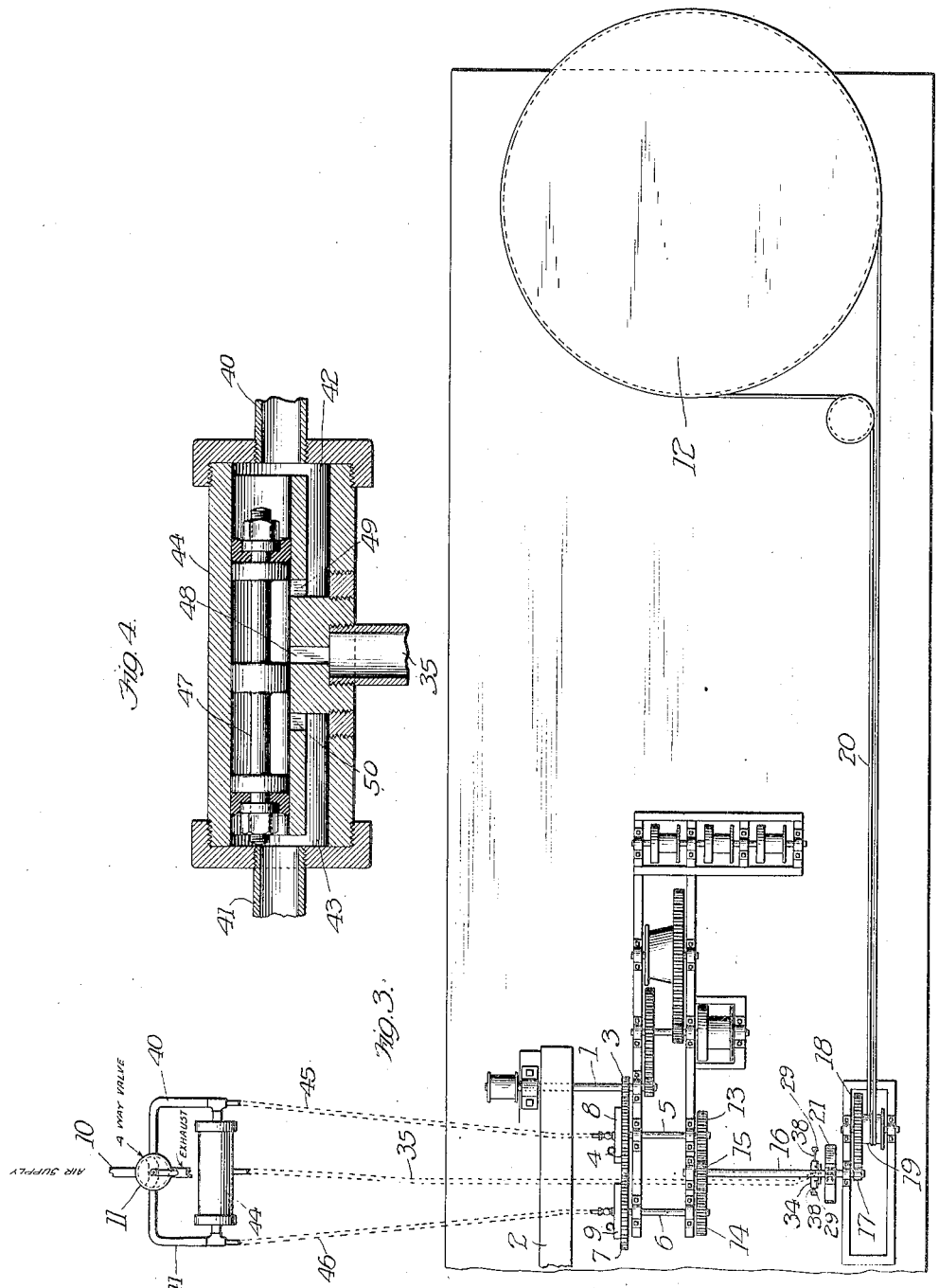
Dec. 11, 1923.
G. B. MASSEY
BRAKE AND CONTROL SYSTEM FOR SWINGING BOOMS
Filed May 24, 1923  2 Sheets-Sheet 2

1,476,989

UNITED STATES PATENT OFFICE.

GEORGE B. MASSEY, OF CHICAGO, ILLINOIS, ASSIGNOR TO RANDOLPH-PERKINS CO., OF CHICAGO, ILLINOIS, A CORPORATION OF ILLINOIS.

BRAKE AND CONTROL SYSTEM FOR SWINGING BOOMS.

Application filed May 24, 1923. Serial No. 641,085.

*To all whom it may concern:*

Be it known that I, GEORGE B. MASSEY, a citizen of the United States of America, and a resident of Chicago, county of Cook, and State of Illinois, have invented a new and useful Improvement in Brake and Control Systems for Swinging Booms, of which the following is a specification.

This invention relates to the operating mechanism for booms or cranes used in dredges or hoisting apparatus, wherein the boom has a horizontal swinging motion. The improvements herein described are means for controlling the boom in its horizontal motions and for checking and holding the boom at any desired position of its arc of motion.

The objects of the invention are to provide an improved brake which operates with the same degree of efficiency, irrespective of the direction of rotation of the shaft controlled by the brake, and to provide pneumatic operating means for the brake, which is controlled automatically with a pneumatic clutching mechanism for a reverse gear drive.

The objects of the invention are accomplished by the construction as shown in the accompanying drawings, wherein:

Figure 1 is a front elevation of the improved brake mechanism with the cylinder and operating pistons therefor shown in section.

Figure 2 is an end view of the brake with the brake band shown in section.

Figure 3 is a diagrammatic plan view of a dredge showing the general arrangement of the drive mechanism, including reverse gears, and the location of the brake for the swinging boom.

Figure 4 is an enlarged sectional view of an automatic valve or controlling device which insures the release of the brake whenever power is applied to drive the boom in one direction or the other.

The construction as illustrated, includes a horizontally disposed oscillating table upon which the operating boom is mounted, and a reversible drive mechanism for this table. Power is applied to the table to drive it in one direction or the other by reversely driven gears, either of which may be clutched to a drive shaft by a pneumatically operated clutch. The brake for preventing horizontal movement of the boom is normally effective by spring pressure, but is released whenever air is admitted to the operating cylinder of one of the clutches. The pneumatic clutches are of known construction, and, therefore, are not shown in detail in the drawings. The present improvements relate particularly to the construction of the brake and the pneumatic means for effecting a release of the brake whenever air is admitted to the cylinder of one of the clutches.

The drive mechanism as illustrated in Figure 3, includes the horizontal shaft 1, which is rotated by means of a belt 2, and carries a pinion 3 meshing with the gear 4 normally loose on shaft 5. Parallel with shaft 5 is another similar shaft 6, which supports a gear 7 of the same size as gear 4 and meshing therewith. Either of gears 4 or 7 may be clutched to their respective shafts 5 and 6 by pneumatic clutches 8 and 9. Air is admitted into either of these clutches from a supply pipe 10 through a valve 11. This is a four-way valve, so that when air is admitted to one clutch, the other clutch may exhaust through the valve. When the valve 11 is in its middle or normal position as shown, either clutch and the brake may exhaust.

The oscillating boom support 12 receives motion from either of the oppositely driven shafts 5 and 6 through one or the other of the gears 13 or 14 fast to shafts 5 and 6 and meshing with a pinion 15 upon shaft 16.

The shaft 16 carries fast a pinion 17 meshing with a gear 18 rigid with drum 19. Drum 19 is connected with the oscillating table 12 by the cable 20. The brake for cable 20 is located upon shaft 16 and is indicated by the numeral 21.

This brake as shown in Figures 1 and 2 consists of a brake drum 22 keyed to shaft 16 and around which passes the brake band 23 having the usual brake lining 24 and preferably made in two sections, 25 and 26, having an adjustable connection 27 at their upper ends. The opposite ends of the sections of the brake band are pivotally connected to arms 28 of bell crank levers 29. These bell crank levers are normally urged toward each other by spring 30 bearing against one of the bell crank levers 29 and against a head 31 of a pair of rods 32 passing along the sides of the levers 29, and at their opposite ends being connected together by a link 33 bearing against one of levers 29.

In order to release the brake, air is admitted to a cylinder 34 through a conduit 35. The cylinder 34 is supported upon a bracket 36, and slidable within the cylinder are a pair of pistons 37. A connecting rod 38 extends between the upper end of each of the bell crank levers 29 and one of the pistons 37. As shown in Figure 1, the brake band is in engagement with the brake drum 22, since the bell crank levers 29 are forced toward each other as far as possible by the spring 30. If air is admitted to one of the clutches 8 or 9, Figure 3, thus resulting in driving shaft 16 either to the right or to the left air will simultaneously be admitted to cylinder 34, Figure 1, thus forcing the pistons 37 apart against the action of spring 30 and releasing the brake. Motion of levers 29 in this direction is limited by the straps 39 passing around the short arms of the bell crank levers. If shaft 16 is rotating in a right-hand direction the drag on the brake band will cause the left-hand bell crank lever 29 to assume the position as indicated in Figure 1, with its short arm in contact with the loop of its strap 39. The strap limits the motion of the bell crank lever and its piston 37. Increased pressure of the air in cylinder 34 causes the opposite piston 37 to move to the right more or less, against the action of spring 30, and thus entirely releases the brake from the brake drum 22. The limit of motion of bell crank levers 29 is controlled by the straps 39. If shaft 16 is urged to rotate in a left-hand direction while air is being admitted to cylinder 34, the drag on the brake band will be such as to swing the right-hand bell crank lever outwardly until stopped by its strap 39 before the brake is applied. Then, when the brake is applied, the action is free from abruptness and sudden jar. When valve 11 is turned to a position to permit cylinder 34 to exhaust, spring 30 forces the particular lever 29, which is in the innermost position, further inwardly, cooperating with the drag of the brake drum on the brake band to properly apply the brake.

In order to always effect the release of the brake shown in Figure 1 whenever shaft 16 is driven, regardless of its direction of rotation, the automatic valve device shown in Figure 4, is provided. The four-way valve 11 may be set to admit air to either of the conduits 40 or 41. These respectively communicate with conduits 45 and 46, respectively, leading to the pneumatic clutches 8 and 9 on the shafts 5 and 6. If air is admitted through the conduit 45 to the cylinder of clutch 8, the cylinder of clutch 9 may exhaust back through the conduit 46, conduit 41 and valve 11. Accordingly, when one clutch is applied, the other is automatically released, but whenever air is admitted to one of the clutches, some of the air also enters valve body 44 and passes into conduit 35 leading to the brake release cylinder 34.

If air is admitted to the conduit 40, part of the air enters chamber 42 of valve body 44, and a piston 47 slidable in the valve body 44, assumes the position as indicated in Figure 4.

In this position of the piston a central port 48 is in communication with a side port 49, whereas if air is admitted to the conduit 41, the central port 48 is brought into communication with a side port 50, chamber 43, and conduit 41. Thus, no matter which clutch is applied, air is simultaneously admitted to the brake releasing cylinder 34 through the port 48 and conduit 35.

In the operation of the mechanism described, which pertains to swinging a boom, not shown, but movable with platform 12 around a vertical axis and holding the boom and this platform in any of its set positions when not actually being driven, the control is effected entirely by means of valve 11. Assuming that belt 2 is continuously driven, and valve 11 is adjusted to admit air to the conduit 40, then gear 4 will be clutched to its shaft 5, while gear 7 will be released from its shaft 6 and the clutch for the latter gear will be permitted to exhaust through the conduits 46 and 41 to valve 11. At the same time, due to the air forcing piston 47 to the left, Figure 4, a pressure is developed in the brake release cylinder 34 by the air flowing from conduit 40 through the space 42, ports 49 and 48 into the conduit 35. If the rotation of shaft 16 is reversed by shifting valve 11 to a position to admit air into conduit 41, then the piston 47 will move to the right, Figure 4, and permit some of the air from conduit 41 to pass through the ports 50 and 48 into the conduit 35, and thus again hold the brake 21 in releasing position. If the supply of air is cut off, the pressure in cylinder 34, Figure 1, will drop, permitting the spring 30 to automatically apply the brake, since cylinder 34 is free to exhaust through the conduit 35 unless the air is forced into this conduit under pressure.

Although but one specific embodiment of this invention has been herein shown and described, it will be understood that numerous details of the construction shown may be altered or omitted without departing from the spirit of this invention as defined by the following claims.

I claim:

1. A control system of the class described, comprising driving gears, a driven shaft, a pneumatic clutch for connecting said driving gears with said driven shaft, a brake for said driven shaft, a valve for controlling the operation of said pneumatic clutch with connections for operating said brake.

2. A control system of the class described, comprising a drive mechanism including reverse gearing, pneumatically operated clutches for controlling the operation of said gearing, a driven shaft, a pneumatically controlled brake for said driven shaft, and a valve mechanism for simultaneously controlling the operation of said reverse gearing and said brake.

3. A control system of the class described, comprising a drive mechanism including reversely driven gears, a driven shaft, pneumatically operated clutches for rendering one or the other of said gears effective with respect to said driven shaft, a normally effective brake for said driven shaft, pneumatic releasing means for said brake, and a controlling device for said clutches having connections for operating said pneumatic releasing means whenever one of said clutches is rendered effective.

4. In a control system of the class described, two fluid pressure operated clutches, a valve for controlling the admission and exhaust of fluid to and from said clutches, a spring actuated brake, fluid pressure operated means for releasing said brake, and a fluid pressure operated valve arranged to admit fluid to said means when either of said said clutches is operated.

5. In a control system of the class described, two fluid pressure operated clutches. a valve for controlling the admission and exhaust of fluid to and from said clutches, a spring actuated brake, fluid pressure operated means for releasing said brake, and a fluid pressure operated valve arranged to admit fluid to said means when either of said clutches is operated, said fluid pressure operated valve comprising a cylinder, a piston, a central port and two side ports in said cylinder, said piston operating to connect said central port with either of said side ports.

6. A brake of the class described, comprising a brake drum, a brake band passing around said drum, each end of said band being connected to a lever, a cylinder, a pair of opposed pistons in said cylinder, each of said pistons being connected with one of said levers, a spring for urging said levers toward each other, and means for admitting fluid under pressure to said cylinder between said pistons.

7. A brake of the class described, comprising a brake drum, a brake band passing around said drum, each end of said band being connected to a bell crank lever, a cylinder, a pair of opposed pistons in said cylinder, each of said pistons being connected with one of said bell crank levers, a spring for urging said bell crank levers toward each other, and means for admitting fluid under pressure to said cylinder between said pistons.

8. A brake of the class described, comprising a brake drum, a brake band passing around said drum, each end of said band being connected to a lever, a cylinder, a pair of opposed pistons in said cylinder, each of said pistons being connected with one of said levers, a spring for urging said levers toward each other, and means for admitting fluid under pressure to said cylinder between said pistons, and stops for limiting the motion of each of said levers.

9. A brake of the class described, comprising a brake drum, a brake band passing around said drum, each end of said band being connected to a lever, a cylinder, a pair of opposed pistons in said cylinder, each of said pistons being connected with one of said levers, means for admitting fluid under pressure to said cylinder between said pistons, and a spring for opposing motion of said pistons.

Signed at Chicago this 18 day of May 1923.

GEORGE B. MASSEY.